United States Patent [19]

Krämer

[11] Patent Number: 5,038,913
[45] Date of Patent: * Aug. 13, 1991

[54] APPARATUS FOR OPTIONAL REMOVAL OF PACKAGES IN THE LONGITUDINAL OR TRANSVERSE DIRECTION ONTO A CONVEYOR BELT OF A PACKING MACHINE

[75] Inventor: Erhard Krämer, Ratingen, Fed. Rep. of Germany

[73] Assignee: Benz & Hilgers GmbH, Dusseldorf, Fed. Rep. of Germany

[*] Notice: The portion of the term of this patent subsequent to Nov. 13, 2005 has been disclaimed.

[21] Appl. No.: 10,886

[22] Filed: Feb. 4, 1987

[30] Foreign Application Priority Data

Feb. 4, 1986 [DE] Fed. Rep. of Germany ....... 3603297

[51] Int. Cl.5 ............................................. B65G 47/24
[52] U.S. Cl. ................................... 198/377; 198/412
[58] Field of Search ................. 198/374, 377, 411, 412

[56] References Cited

U.S. PATENT DOCUMENTS

| 2,779,453 | 1/1957 | Lippert et al. | 198/377 |
| 3,189,158 | 6/1965 | Lucas | 198/377 |
| 3,269,516 | 8/1966 | Lucas | 198/377 |
| 3,677,389 | 7/1972 | Benatar et al. | 198/377 |
| 4,283,973 | 8/1981 | Spencer | 198/377 X |
| 4,483,526 | 11/1984 | Bulka et al. | 198/377 X |
| 4,530,694 | 7/1985 | Kobler et al. | 198/377 X |

FOREIGN PATENT DOCUMENTS

| 1910828 | 1/1974 | Fed. Rep. of Germany . |
| 2434362 | 1/1976 | Fed. Rep. of Germany ...... 198/377 |
| 2255474 | 11/1980 | Fed. Rep. of Germany . |
| 394014 | 11/1965 | Switzerland ........................ 198/377 |

Primary Examiner—D. Glenn Dayoan
Attorney, Agent, or Firm—Klein & Vibber, P.C.

[57] ABSTRACT

A method and apparatus for the optional removal of packages in the longitudinal or transverse direction onto a conveyor belt of the packing machine, the packages being continuously guided automatically both in their removal in the longitudinal direction and in their removal in the transverse direction by means of a rotary device and an oblique track roller guide system which is provided with an adjustable guide deflector by which guide rollers of a steering gear of the rotary device are automatically guided. By adjusting the guide deflector parallel or obliquely to the direction of travel of the packages, they can be removed in the longitudinal direction or, after being turned through an angle of 90 degrees, in the transverse direction onto a conveyor belt.

9 Claims, 6 Drawing Sheets

APPARATUS FOR OPTIONAL REMOVAL OF PACKAGES IN THE LONGITUDINAL OR TRANSVERSE DIRECTION ONTO A CONVEYOR BELT OF A PACKING MACHINE

BACKGROUND OF THE INVENTION

The invention relates to a method and apparatus for optional removal of packages or the like in the longitudinal or transverse direction onto a conveyor belt of a packing machine.

In practice, the problem of removing packages or the like has heretofore been solved in various ways. Systems are known, for instance, in which packages are pushed from a rotary table, by a lifting movement of transfer devices, operating like paddles, onto a rotary plate which after receiving a package is turned in a timed stroke through an angle of 90 degrees, so that the packages are conveyed onto the subsequent conveyor belt after being turned through an angle of 90 degrees in relation to the position which they occupied when received. With the particularly high performance rates of the packaging machines now in use, the adoption of this method is precluded by the comparatively long distances over which the "thrust paddles" have to be controlled.

Systems have also become known in which a toothed belt is caused to revolve about the rotating table and is fitted with finger-shaped entrainment devices by which the packages can be transferred both in the longitudinal and in the transverse direction to a subsequent conveyor belt. While the transfer operation is in itself quite satisfactory in the longitudinal direction, i.e. while the conveyor belt is moving straight ahead, the transfer of the packages into the transverse direction, i.e. at an angle of 90 degrees in relation to the transfer in the longitudinal direction, is entirely unsatisfactory. The reason is that in order to deflect it from the initially longitudinal movement of its transfer from the rotary table, a corner of each package knocks against a fixed deflector, the package thus being enabled to rotate freely. This uncontrolled rotation of the packages is in no way reliable, in addition to which the danger arises that they will suffer unacceptable damage, particularly in the case of soft contents, such as butter.

Finally, the prior art includes a package removal system in which longitudinal or transverse transport, which ever is required, is effected by means of a so-called alternating cassette. This result is obtained by pushing the packages off the rotary table by the aid of a horizontally revolving roller chain and driving fingers attached thereto, the package then being turned through an angle of 90 degrees by interaction with guide elements in the curve, after which they pass to the removal conveyor apparatus. For the removal of the packages in the longitudinal direction, another alternating cassette is required, in which angular driving fingers are provided. The effort involved in removing packages optionally in the longitudinal or the transverse direction is thus considerable, this operation being hardly feasible at all, particularly in the case of high speed packing machines, the re-adaptation of the machine for the purpose being very time consuming. With high speed machines, moreover, there is the additional danger that the entrainment devices revolving horizontally with the roller chain can easily compress soft packages in an unacceptable manner, thus rendering them unuseable.

SUMMARY OF THE INVENTION

It is an object of the present invention to provide a method by means of which the packages or the like can be removed optionally in the longitudinal or in the transverse direction by very simple measures. A further object is to provide an apparatus of very simple construction which is easy to operate by means of which the packages or the like will be removed in a faultless manner and without damage, even in the case of high operating speeds.

From the method point of view, the solution of the present invention is a method in which the packages or the like, throughout their total removal, are continuously guided automatically both in the longitudinal and in the transverse direction by equal controllable receivers. The means provided by the invention thus ensure that the packages are guided continuously and are turned for transverse transport without suffering damage, so that throughout the entire removal operation, whether in the longitudinal or in the transverse direction, the packages are guided in a controlled manner. The means provided by the invention thus ensure that the packages are guided continuously and are turned for transverse transport without suffering damage, so that throughout the entire removal operation, whether in the longitudinal or in the transverse direction, the packages are guided in a controlled manner. An advantageous embodiment of the present invention is one in which during the removal of the packages in the transverse direction, the receivers automatically guiding the packages or the like are turned through an angle of 90 degrees during their continuous feed movement in relation to the position occupied in the removal of the packages or the like in the longitudinal direction. This means that the feed movement and the rotary movement of the packages in the transverse removal occur simultaneously, so that even with very high performance rates the packages can be turned through an angle of 90 degrees in a fully satisfactory manner.

For the performance of the method to which the invention relates, the invention provides an apparatus for the removal of packages or the like, from a rotary table driven in rotation, in the longitudinal or transverse direction onto a rectilinearly moved conveyor belt, by the aid of a conveyor chain or the like, driven in rotation, and of entrainment devices connected therewith. The invention is considered to reside in the fact that the entrainment devices take the form of receiver compartments seizing packages or the like on more than one side and are controllable by a rotating device. This provides an apparatus particularly easy to operate, since, in the removal of the packages in the longitudinal direction, the rotation device is not used, i.e. the packages are taken just as they arrive from the rotary table and transferred to the conveyor belt; while in the removal of the packages in the transverse direction, the rotation device becomes operative, the packages being rotated continuously when being fed towards the conveyor belt. An apparatus is thus obtained in which the packages are automatically guided at all times, whether being removed in the longitudinal or in the transverse direction, so that controlled transfer of the packages, without causing damage thereto, is constantly ensured.

In an advantageous embodiment of the apparatus of the invention, the rotation device has a steering mechanism and an at least partially oblique track roller guide system. The conditions required for the removal operations both in the transverse or in the longitudinal direction are thus fulfilled with one single gearing unit and an oblique track control system. It has been found of advantage that the steering mechanism be provided with adjusting bars which are automatically guided by the oblique track roller guide system and to which layers are articulated and secured to holding pins belonging to the "receiver compartments" and rotatably mounted in transverse straps rotating with the conveyor chain. Not only as a result of this system but also due to a special construction adopted for the receiver compartments, the desired automatic guiding action and non-destructive treatment of the packages or the like are ensured at all times. It has also been found advantageous, for example, for the receiver compartments to be provided with a base surface, serving to secure the holding pins, with a rear wall starting therefrom and with two sidewalls. This ensures that the packages will be reliably guided regardless of whether the receiver compartments are rotated or not.

This is assisted if with each adjusting bar there is associated a guide roller interacting with the oblique track. This enables a packing machine to be equipped when two package tracks are situated side-by-side. In this case, each of the two ends of the adjusting bar is fitted with a lever, each lever serving for the control of one receiver compartment.

A particularly important feature of the invention is the fact that a guide deflector, as part of the oblique track, is provided for the guide rollers. This deflector can be adjusted from a basic position, for the removal of packages in the longitudinal direction, to a lateral position, the guide deflector being connected to an adjusting device which can be fixed in position on the frame of the packing machine.

Use can be made of a revolving removal chain so that the rotatable receiver compartments can be guided by the chain and the closed deflector by the receiver compartments, thus providing a particularly simple means of removing either in the longitudinal or the transverse direction as desired.

BRIEF DESCRIPTION OF THE DRAWING

With these and other objects in view, which will become apparent in the following detailed description, the present invention, which is shown by example only, will be clearly understood in connection with the accompanying drawing, in which.

DESCRIPTION OF THE PREFERRED EMBODIMENT

Figure 1:
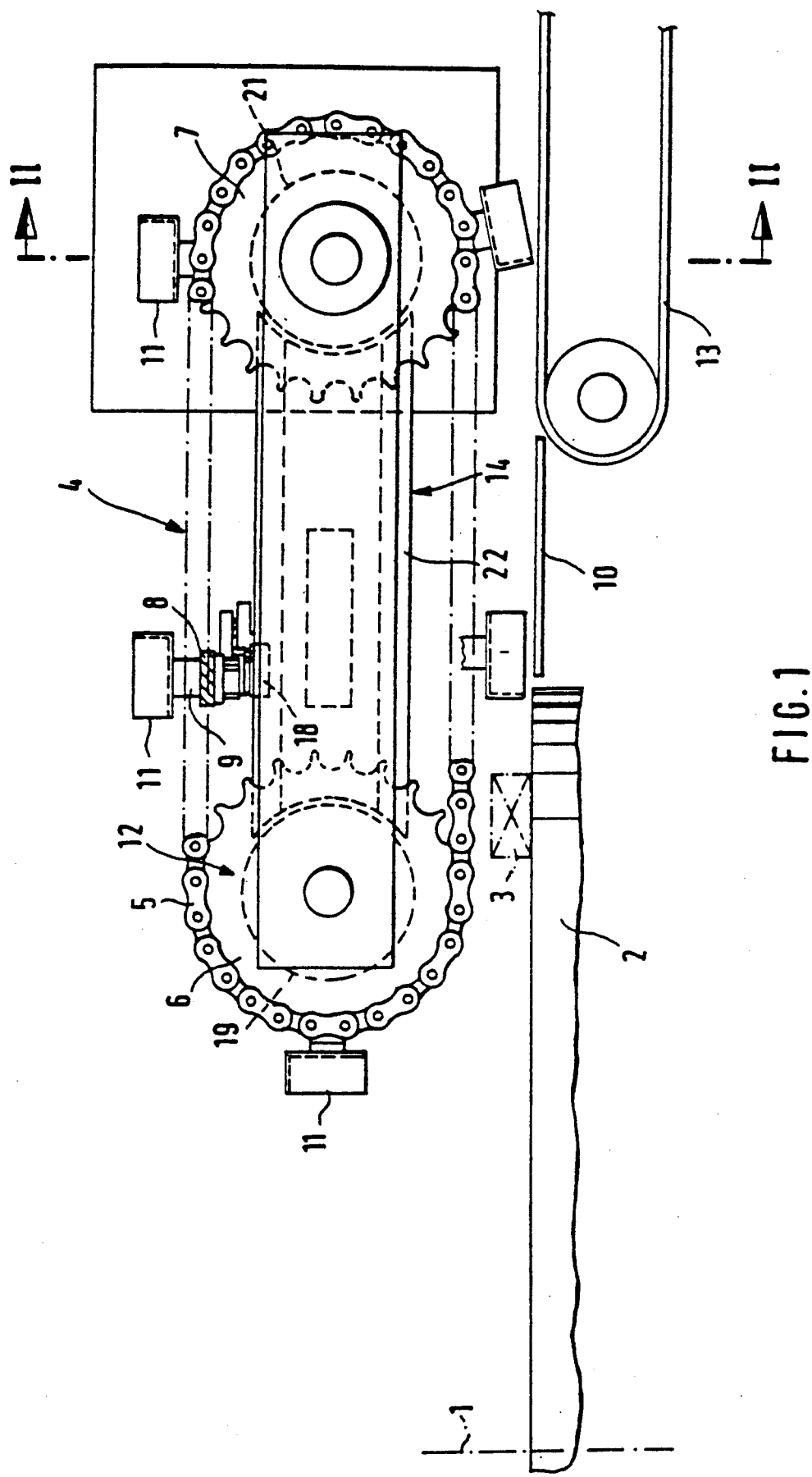
FIG. 1 is a schematic diagram of the apparatus as seen from the front.
Figure 2:
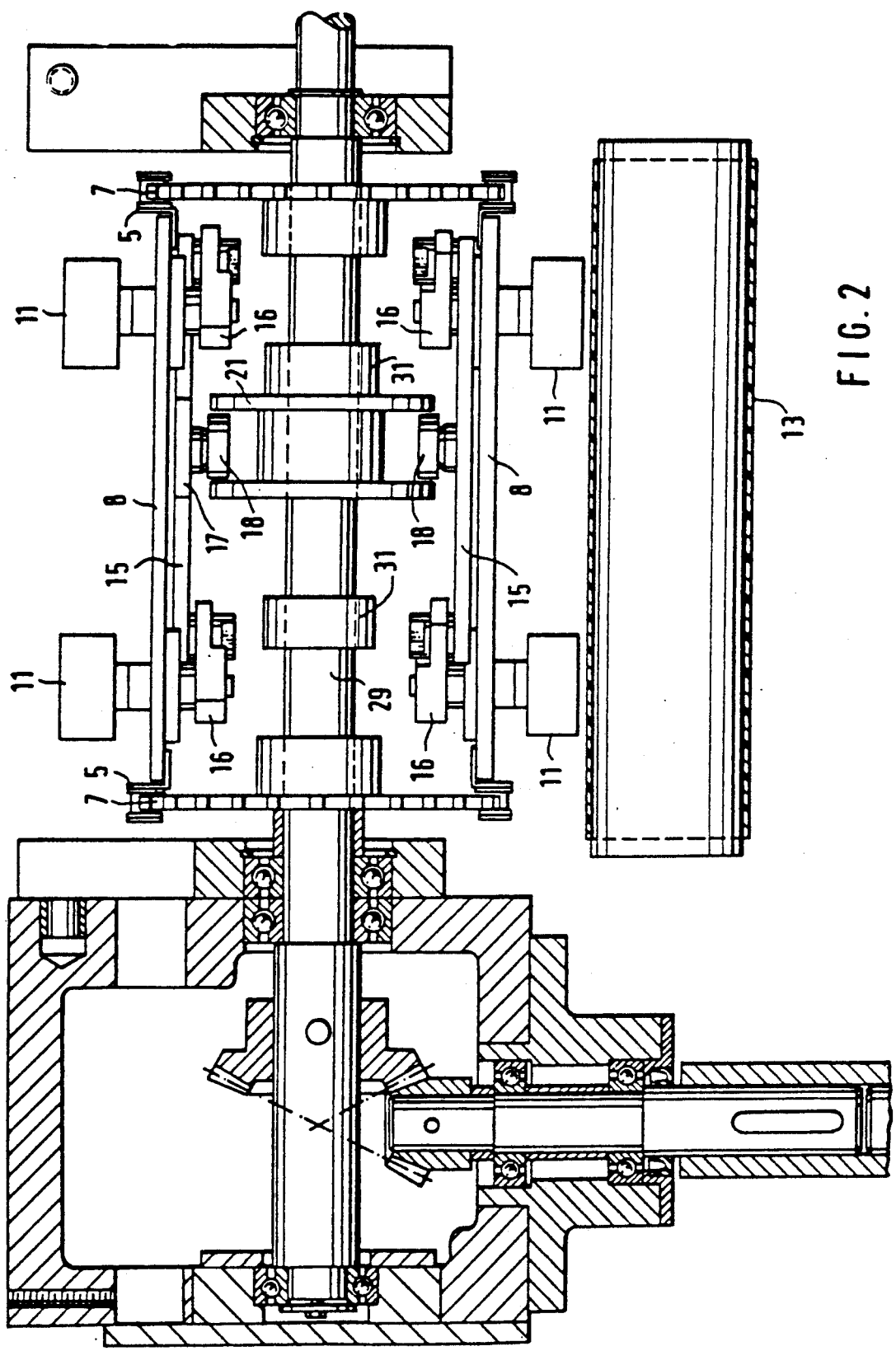
FIG. 2 is a sectional along line II—II of FIG. 1.

Referring to FIGS. 1 and 2, a rotary table 2 is shown revolving about a vertical axis 1 and being part of a packing machine not shown in detail. In a known manner, by means of rotary table 2, packages 3 are fed into a position where they are to be removed by a removal device 4, described in further detail below, to a conveyor belt 13 moving in a straight line. Between the rotary table 2 and the conveyor belt 13 a transfer table 10 is provided on which the packages 3 are transported from the rotary table 2 to the conveyor belt 13 in the manner described below.

The removal device 4 comprises two conveyor chains 5 situated a certain distance apart and taking the form of roller chains which are guided over deflector wheels 6 and 7. At certain points on the conveyor chain 5, transverse straps 8 are provided which interconnect chains 5 and in which holding pins 9 belonging to receiver compartments 11 acting as entrainment devices for the packages 3 or the like are rotatably mounted. A rotary device 12 and an oblique track roller guide system 14 are provided for the purpose of controlling the said receiver compartments.

Figure 3:
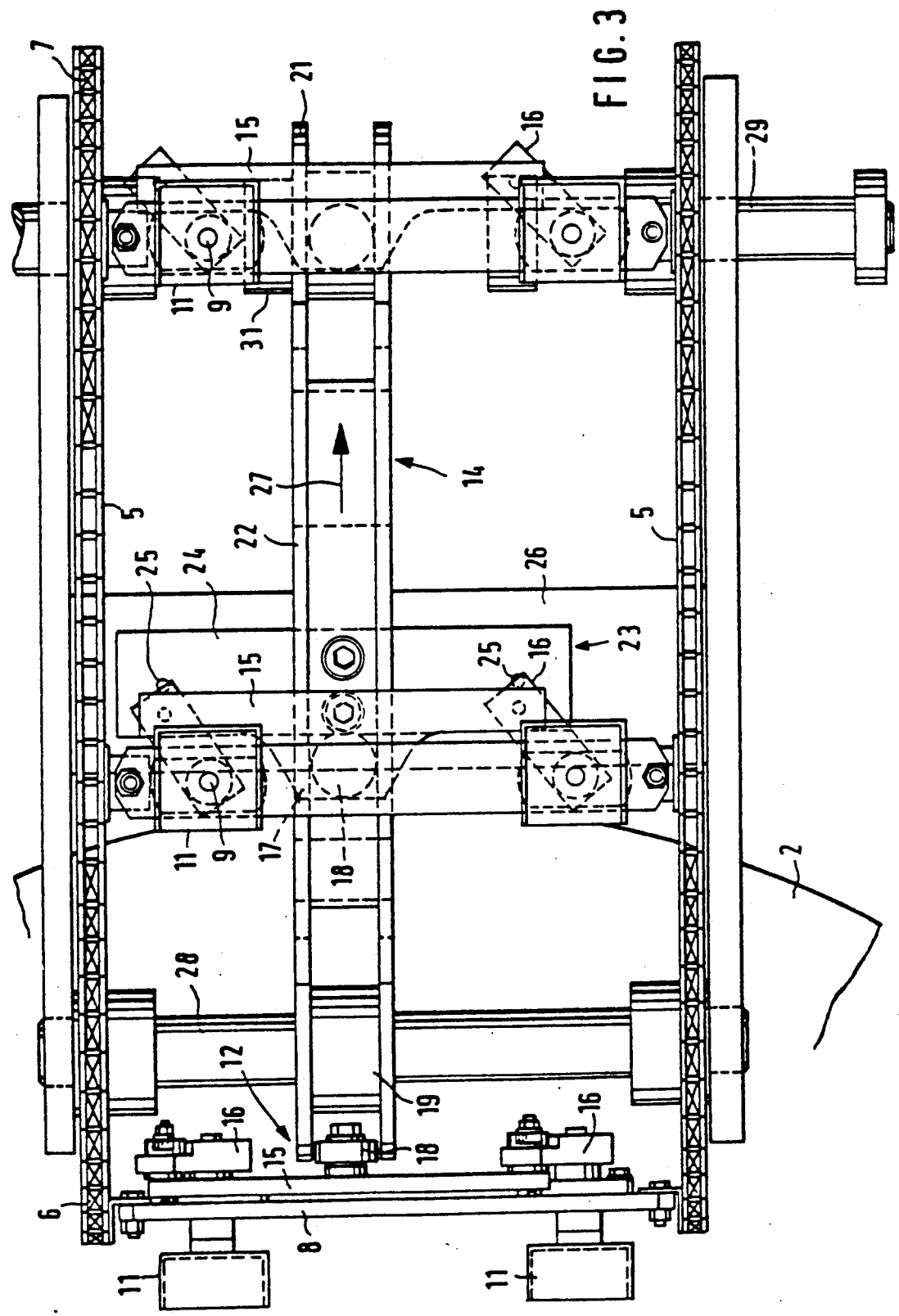
FIG. 3 is a simplified view of the apparatus from above during the removal of the packages or the like in the longitudinal direction.
Figure 4:
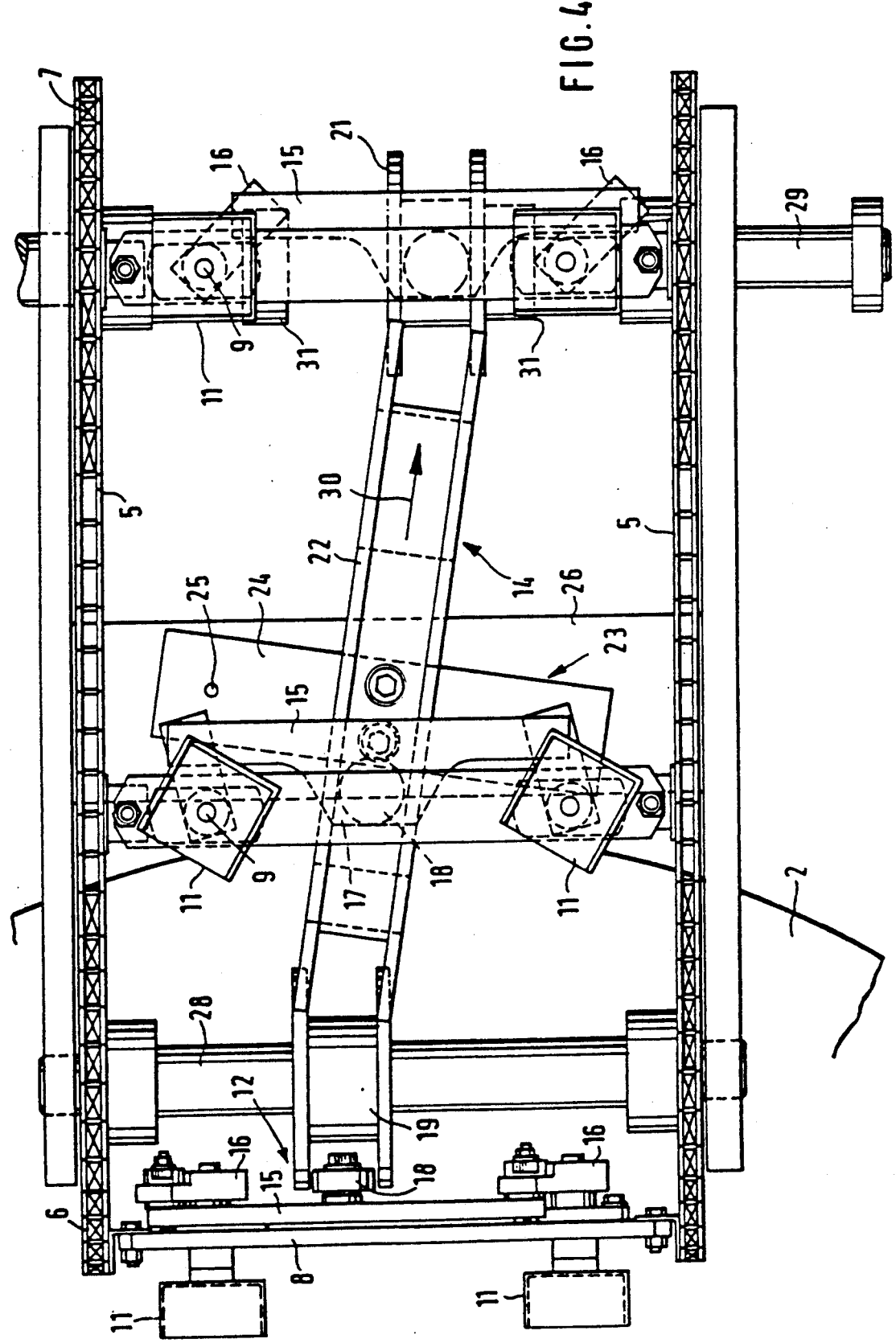
FIG. 4 is a corresponding view of the packages, similar to FIG. 3, but during their removal in the transverse direction.

The details of the rotary device 12 and of the oblique track roller guide system 14 may be seen in FIGS. 3 and 4. In the version shown therein receiver compartments 11 are arranged opposite one another in pairs so that two packages or the like can be removed simultaneously. In this case, the rotary device 12 consists of a steering gearing with an adjusting bar 15 with levers 16 which are articulated to its ends and which in their turn are affixed, e.g. clamped, to the holding pins 9 of the receiver compartments 11. A projecting attachment 17 of the adjusting bar 15 bears a guide roller 18 which interacts with the oblique track roller guide system 14. The latter has an oblique track consisting of an inlet part 19 and outlet part 21 and an adjustable guide deflector 22 between them. The guide deflector 22 can be adjusted by means of an adjusting and securing device 23 and fixed in position for which purpose a bar 24 is provided with tight fit screws 25. By means of these tight fit screws 25 which can be inserted in the apparatus of a frame 26 belonging to the packing machine and only shown in elementary fashion, the guide deflector 22 can be locked in either the position shown in FIG. 3 or that shown in FIG. 4, as desired. In the former case, guide roller 18 of each steering gearing moves in accordance with the arrow 27 through the guide deflector 22, while in the case of FIG. 4, the guide roller 18 is moved as shown by the arrow 30 through the guide deflector 22 adjusted in relation to the position shown in FIG. 3. While the inlet part 19 of the oblique track always assumes the same position regardless of the position of the guide deflector 22, e.g. assumes a position on the bearing shaft 28 belonging to the deflector wheel 6 of the conveyor chain 5 and only shown in elementary fashion, the outlet part 21, after the adjustment of the guide deflector 22 must likewise be adjusted, this being done for example on the bearing shaft 29 belonging to the deflector wheel 7 of the conveyor chains 5 and likewise only shown in elementary fashion. The axial adjustment of the outlet part 21 can be limited by means of stop rings 31 mounted on the said bearing shaft 29.

Figure 5:
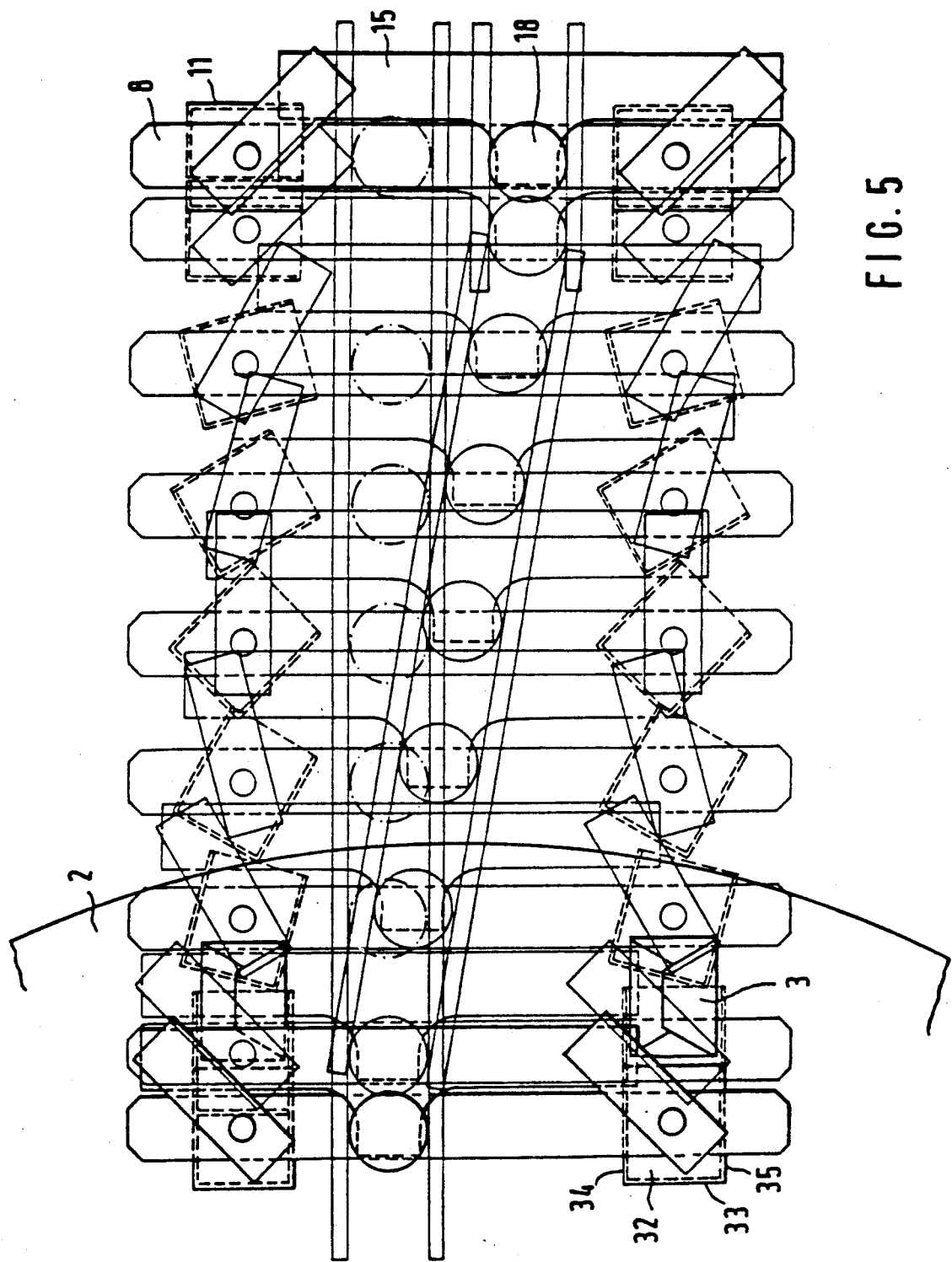
FIG. 5 is a diagram of the sequence of movement of the packages or the like or the receiver compartments accommodating them, both in their removal in the longitudinal direction and in their removal in the transverse direction.

The manner in which the apparatus operates will be described in greater detail as follows:

The packages 3 are situated on the known manner in the rotary table 2 in the longitudinal direction, i.e. in the direction of the motion of the conveyor belt 13. The packages 3 are siezed by that receiving compartments 11 resting on the rotary table 2 from above in such a way that a base 32 of the receiver compartments is situated above the packages and the latter are also engaged by a rear wall 33 and side walls 34 and 35 of said receiver compartments (FIG. 5). If the packages are to be conveyed without turning, i.e. conveyed to the conveyor belt 13 in the longitudinal direction, the rotary device 12 remains inoperative, the adjustable guide deflector 22 being fixed in the position shown in FIG. 3 by the adjusting and securing device 23. After the complete circulation of the conveyor chains 5, constructed as roller chains, and thus of the receiver compartments 11, the packages are removed without being turned, since the guide rollers 18 pass through the guide deflector 22 in the direction shown by the arrow 27 and without acting on the steering gear. If, on the other hand, the packages are to be delivered by the rotary table 2 to the conveyor belt 13 after being turned through an angle of 90 degrees, the guide deflector 22 is pivoted laterally into the position shown in FIG. 4 and fixed in this position by the tight fit screws 25 in the frame 26 of the machine. The result is that the guide rollers 18 pass through the guide deflector 22 in a direction oblique in relation to the longitudinal direction as a result of which via the steering gear, i.e. the adjusting bars 15 of the levers 16, the holding pins 9 and thus the receiver compartments 11 are rotated continuously as shown in FIG. 5 so that the packages can be delivered to the conveyor belt 13 after having been turned through an angle of 90 degrees.

Figure 6:
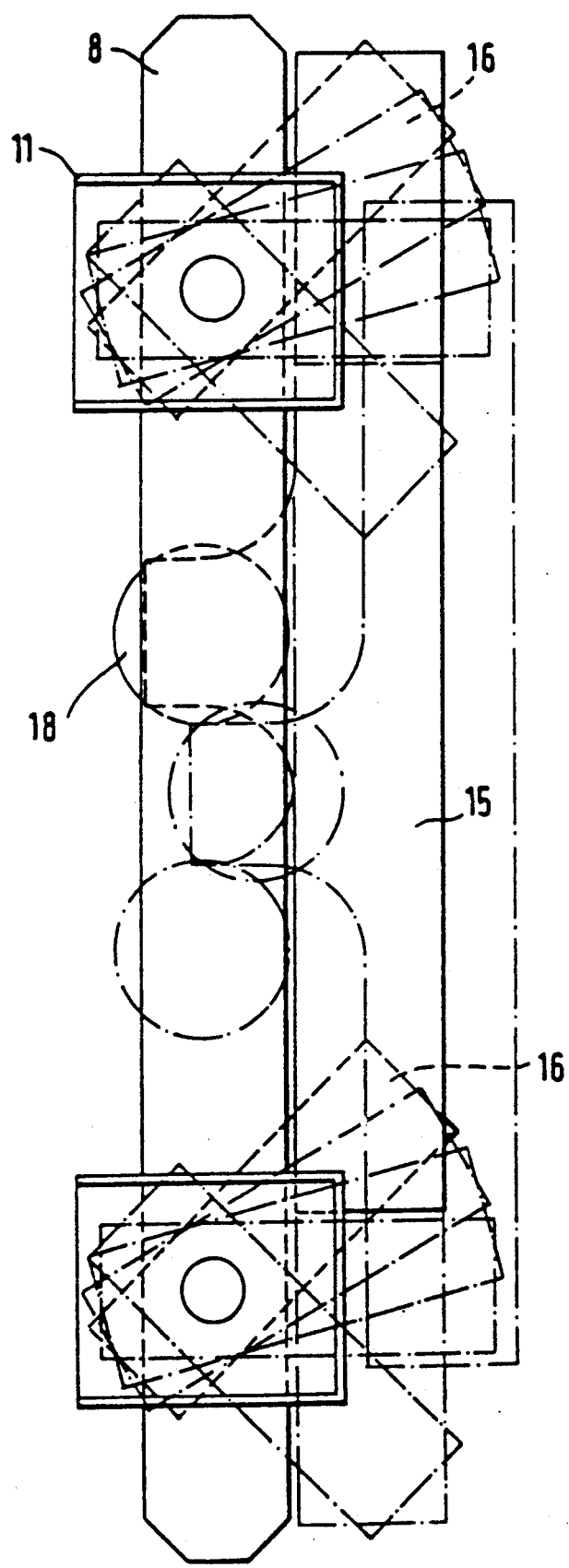
FIG. 6 is a diagram of the sequence of movements of a steering mechanism controlling the receiver compartments.

The entire sequence of movements of the steering gear for each complete cycle is shown in FIG. 6.

Needless to say, the invention is not limited to the example illustrated but allows for modifications within the limits of the claims. For example, the rotary device could as a general principle equally well consist of toothed racks and a pinion. Furthermore, the rotary table 2 could be replaced by some other delivery device for the packages.

I claim:

1. An apparatus for the removal of packages from a delivery device to a conveyor in optionally only the longitudinal or in the longitudinal and transverse direction by means of a conveyor chain and entrainment devices connected therewith, wherein said entrainment devices comprise receiver compartments seizing the packages on more than one side and said entrainment devices are controllable by means of a rotating device;

said rotating device comprises a steering mechanism and an adjustable track roller guide; and said receiver compartments comprise holding pins extending therefrom, said entrainment devices include a transverse strap for each pair of receiver compartments, said holding pins being rotatably mounted in said transverse straps, said transverse straps moving with said conveyor chain to which they are attached, and wherein said steering mechanism comprises adjusting bars which are automatically guided by the track roller guide and articulated levers which are secured to said holding pins and are rotatably mounted in said adjusting bars.

2. An apparatus as claimed in claim 1, wherein said receiver compartments are provided with a base surface and a rear wall and two side walls projecting therefrom.

3. An apparatus as claimed in claim 1, further comprising a guide roller associated with each adjusting bar and interacting with the track roller guide.

4. An apparatus as claimed in claim 3, further comprising each guide roller being mounted in a projecting attachment of the adjusting bar and a lever articulated to each end thereof, each lever serving to control one of the receiver compartments.

5. An apparatus as claimed in claim 3, further comprising a guide deflector for said guide rollers, said guide deflector being part of said track roller guide.

6. An apparatus as claimed in claim 5, wherein said guide deflector is connected to an adjusting device which can be fixed in position on the frame of the packaging machine.

7. An apparatus as claimed in claim 5, wherein the guide deflector is situated between an inlet part and an outlet part of the track roller guide.

8. An apparatus as claimed in claim 7, wherein said track roller guide includes an inlet and an outlet part which are mounted on bearing shafts or deflector wheels which coact with the conveyor chain constructed as a roller chain.

9. An apparatus as claimed in claim 8, including a pair of stop rings mounted on one of said bearing shafts, said outlet part is axially adjustably mounted between said pair of stop rings on its bearing shaft.

* * * * *